US006232599B1

(12) United States Patent
Littlejohn

(10) Patent No.: US 6,232,599 B1
(45) Date of Patent: May 15, 2001

(54) ION PUMP RELAY CONTROL

(75) Inventor: Duane P. Littlejohn, Manlius, NY (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/173,944

(22) Filed: Oct. 16, 1998

(51) Int. Cl.[7] .............................. B01D 59/44; H01J 49/00

(52) U.S. Cl. ........................... 250/288; 250/283; 250/288

(58) Field of Search .................................... 250/288, 289, 250/282, 281

(56) References Cited

U.S. PATENT DOCUMENTS

| | | | | |
|---|---|---|---|---|
| 3,937,955 | | 2/1976 | Comisarow et al. | 250/283 |
| 4,201,913 | * | 5/1980 | Bursack et al. | 250/288 |
| 4,683,749 | * | 8/1987 | Thurlow et al. | 73/40.7 |
| 4,945,234 | * | 7/1990 | Goodman et al. | 250/291 |
| 5,093,571 | * | 3/1992 | Inomata et al. | 250/288 |
| 5,313,061 | | 5/1994 | Drew et al. | 250/281 |
| 6,121,609 | * | 9/2000 | Littlejohn | 250/288 |

* cited by examiner

*Primary Examiner*—Jack Berman
*Assistant Examiner*—Johnnie L. Smith, II
(74) *Attorney, Agent, or Firm*—I. Mark Asperas

(57) ABSTRACT

A relay control for an ion pump used in a FTICR MS. When it is desired to admit new sample gas into the vacuum system, the high voltage that powers the ion pump is removed from the pump electrode by opening the normally closed relay contact. A normally open contact relay contact is then closed to ground the pump electrode and discharge any stray capacity. The sample valve is opened momentarily to admit new sample gas and after the ions are formed and trapped in the ion cell in the vacuum system the pump is restarted.

6 Claims, 2 Drawing Sheets

ION PUMP RELAY CONTROL

FIELD OF THE INVENTION

This invention relates to a mass spectrometer (MS) which uses the Fourier transform ion cyclotron resonance (FTICR) technique to determine the mass of ions and more particularly to the control of the ion pump used in the vacuum system of the MS.

DESCRIPTION OF THE PRIOR ART

When a gas phase ion at low pressure is subjected to a uniform static magnetic field, the resulting behavior of the ion is determined by the magnitude and orientation of the ion velocity with respect to the magnetic field. If the ion is at rest, or if the ion has only a velocity parallel to the applied field, the ion experiences no interaction with the field.

If there is a component of the ion velocity that is perpendicular to the applied field, the ion will experience a force that is perpendicular to both the velocity component and the applied field. This force results in a circular ion trajectory that is referred to as ion cyclotron motion. In the absence of any other forces on the ion, the angular frequency of this motion is a simple function of the ion charge, the ion mass, and the magnetic field strength:

$$\omega = qB/m \quad \text{Eq. 1}$$

where:

$\omega$=angular frequency (radians/second)

q=ion charge (coulombs)

B=magnetic field strength (tesla)

m=ion mass (kilograms)

The FTICR MS exploits the fundamental relationship described in Equation 1 to determine the mass of ions by inducing large amplitude cyclotron motion and then determining the frequency of the motion. The first use of the Fourier transform in an ion cyclotron resonance mass spectrometer is described in U.S. Pat. No. 3,937,955 entitled "Fourier Transform Ion Cyclotron Resonance Spectroscopy Method And Apparatus" issued to M. B. Comisarow and A. G. Marshall on Feb. 10, 1976.

The ions to be analyzed are first introduced to the magnetic field with minimal perpendicular (radial) velocity and dispersion. The cyclotron motion induced by the magnetic field effects radial confinement of the ions; however, ion movement parallel to the axis of the field must be constrained by a pair of "trapping" electrodes. These electrodes typically consist of a pair of parallel-plates oriented perpendicular to the magnetic axis and disposed on opposite ends of the axial dimension of initial ion population. These trapping electrodes are maintained at a potential that is of the same sign as the charge of the ions and of sufficient magnitude to effect axial confinement of the ions between the electrode pair.

The trapped ions are then exposed to an electric field that is perpendicular to the magnetic field and oscillates at the cyclotron frequency of the ions to be analyzed. Such a field is typically created by applying appropriate differential potentials to a second pair of parallel-plate "excite" electrodes oriented parallel to the magnetic axis and disposed on opposing sides of the radial dimension of the initial ion population.

If ions of more than one mass are to be analyzed, the frequency of the oscillating field may be swept over an appropriate range, or be comprised of an appropriate mix of individual frequency components. When the frequency of the oscillating field matches the cyclotron frequency for a given ion mass, all of the ions of that mass will experience resonant acceleration by the electric field and the radius of their cyclotron motion will increase.

An important feature of this resonant acceleration is that the initial radial dispersion of the ions is essentially unchanged. The excited ions will remain grouped together on the circumference of the new cyclotron orbit, and to the extent that the dispersion is small relative to the new cyclotron radius, their motion will be mutually in phase or coherent. If the initial ion population consisted of ions of more than one mass, the acceleration process will result in a multiple isomass ion bundles, each orbiting at its respective cyclotron frequency.

The acceleration is continued until the radius of the cyclotron orbit brings the ions near enough to one or more detection electrodes to result in a detectable image charge being induced on the electrodes. Typically these "detect" electrodes will consist of a third pair of parallel-plate electrodes disposed on opposing sides of the radial dimension of the initial ion population and oriented perpendicular to both the excite and trap electrodes. Thus the three pairs of parallel-plate electrodes employed for ion trapping, excitation, and detection are mutually perpendicular and together form a closed box-like structure referred to as a trapped ion cell. FIG. 1 shows a simplified diagram for a trapped ion cell 12 having trap electrodes 12*a* and 12*b*; excite electrodes 12*c* and 12*d*; and detect electrodes 12*e* and 12*f*.

As the coherent cyclotron motion within the cell causes each isomass bundle of ions to alternately approach and recede from a detection electrode 12*e*, 12*f*, the image charge on the detection electrode correspondingly increases and decreases. If the detection electrodes 12*e*, 12*f* are made part of an external amplifier circuit (not shown), the alternating image charge will result in a sinusoidal current flow in the external circuit. The amplitude of the current is proportional to the total charge of the orbiting ion bundle and is thus indicative of the number of ions present. This current is amplified and digitized, and the frequency data is extracted by means of the Fourier transform. Finally, the resulting frequency spectrum is converted to a mass spectrum using the relationship in Equation 1.

Referring now to FIG. 2, there is shown a general implementation of a FTICR MS 10. The FTICR MS 10 consists of seven major subsystems necessary to perform the analytical sequence described above. The trapped ion cell 12 is contained within a vacuum system 14 comprised of a chamber 14*a* evacuated by an appropriate pumping device 14*b*. The chamber is situated within a magnet structure 16 that imposes a homogeneous static magnetic field over the dimension of the trapped ion cell 12. While magnet structure 16 is shown in FIG. 2 as a permanent magnet, a superconducting magnet may also be used to provide the magnetic field.

Pumping device 14*b* may be an ion pump which is an integral part of the vacuum chamber 14*a*. Such an ion pump then uses the same magnetic field from magnet structure 16 as is used by the trapped ion cell 12. An advantage of using an integral ion pump for pumping device 14*b* is that the integral ion pump eliminates the need for vacuum flanges that add significantly to the volume of gas that must be pumped and to the weight and cost of the FTICR MS. One example of a mass spectrometer having an integral ion pump is described in U.S. Pat. No. 5,313,061.

The sample to be analyzed is admitted to the vacuum chamber 14*a* by a sample introduction system 18 that may, for example, consist of a leak valve or gas chromatograph column. The sample molecules are converted to charged species within the trapped ion cell 12 by means of an ionizer 20 which typically consists of a gated electron beam passing through the cell 12, but may consist of a photon source or other means of ionization. Alternatively, the sample molecules may be created external to the vacuum chamber 14*a* by any one of many different techniques, and then injected along the magnetic field axis into the chamber 14*a* and trapped ion cell 12.

The various electronic circuits necessary to effect the trapped ion cell events described above are contained within an electronics package 22 which is controlled by a computer based data system 24. This data system 24 is also employed to perform reduction, manipulation, display, and communication of the acquired signal data.

When a new sample gas is introduced into an ion pumped vacuum system, the pumping action momentarily dislodges small amounts of the previously pumped sample. This introduces error into the measurement. A custom built ion pump designed to reduce this effect will provide improved performance. Such a pump is, however, expensive. An alternative and lower cost solution is provided by the present invention which quickly disables the ion pump prior to opening the valve that admits new sample gas into the vacuum system. Since the pump is disabled before the new sample gas is admitted into the vacuum system the previously pumped sample cannot be dislodged. The speed with which the pumping action of the ion pump is suspended allows the FTICR MS to have a relatively high sampling rate and essentially no errors.

SUMMARY OF THE INVENTION

The present invention is a mass spectrometer that includes an ion pump and a circuit for controlling said ion pump. The circuit includes a first switch connected between a source of electrical power and the ion pump. The first switch is closed when the ion pump is pumping. The circuit further includes a second switch connected between ground and the ion pump. The second switch is open when the ion pump is pumping. The circuit also includes means for controlling the opening and closing of the first and second switches that is responsive to a signal indicative that the ion pump is to be turned off. The means opens the first switch before the second switch is closed.

The present is also a mass spectrometer that includes an ion pump and a circuit for controlling the ion pump. The circuit includes a first switch connected between a source of electrical power and the ion pump. The first switch is closed when the ion pump is pumping. The circuit also includes a second switch connected between ground and the ion pump. The second switch is open when the ion pump is pumping. The circuit further includes a first device connected to the first switch and a second device connected to the second switch. The first and second devices are responsive to a signal indicative that the ion pump is to be turned off for opening the first switch before the second switch is closed.

DESCRIPTION OF THE PREFERRED EMBODIMENT

Figure 1:
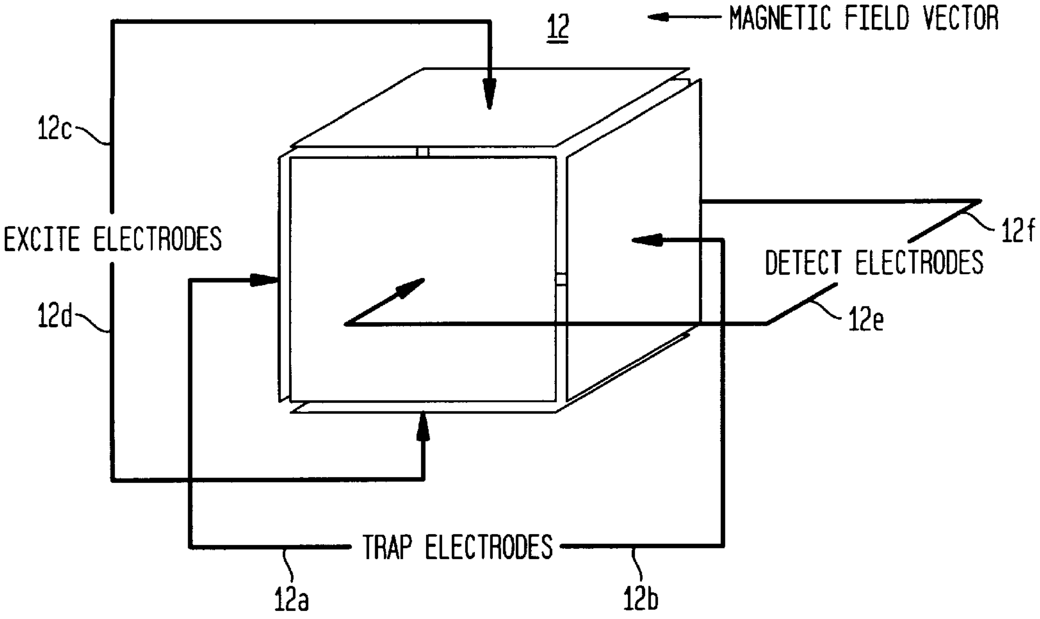
FIG. 1 (PRIOR ART)
FIG. 1 shows a simplified diagram for a trapped ion cell.
Figure 2:
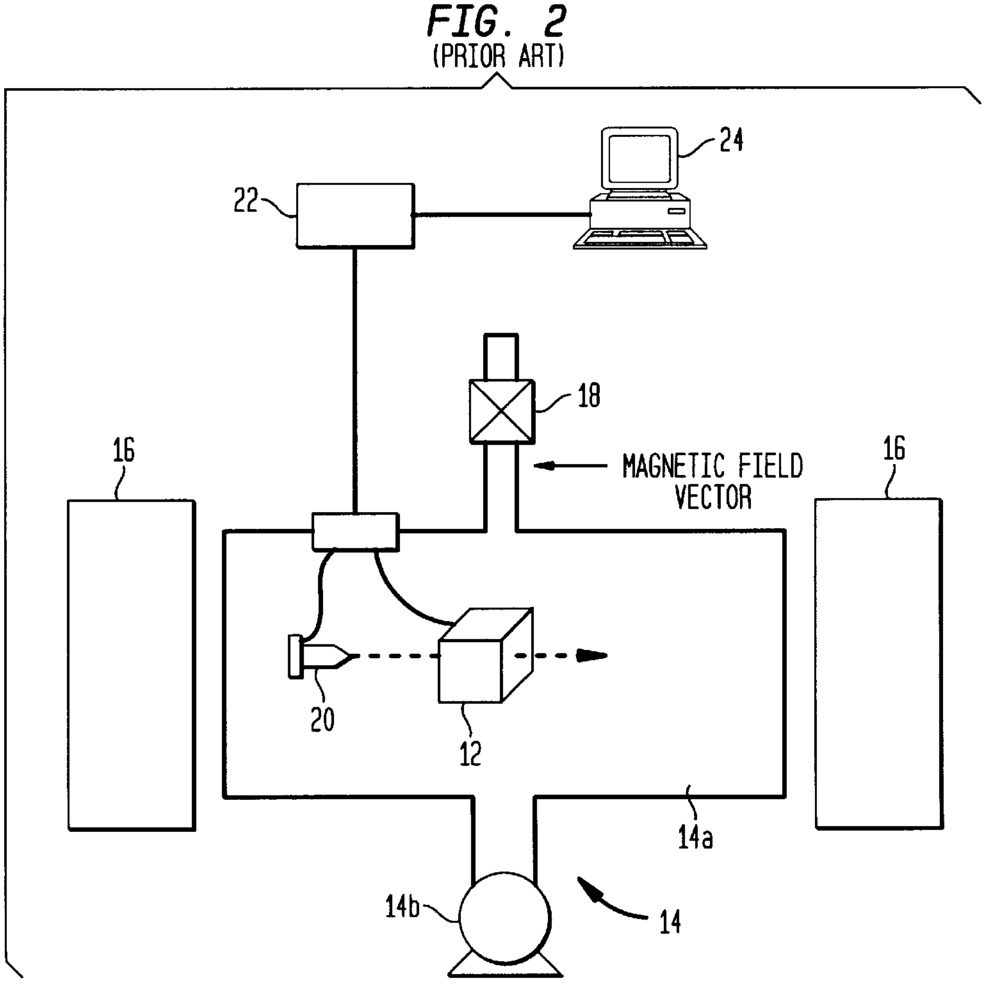
FIG. 2 (PRIOR ART)
FIG. 2 shows a block diagram of a typical FTICR MS.
Figure 3:
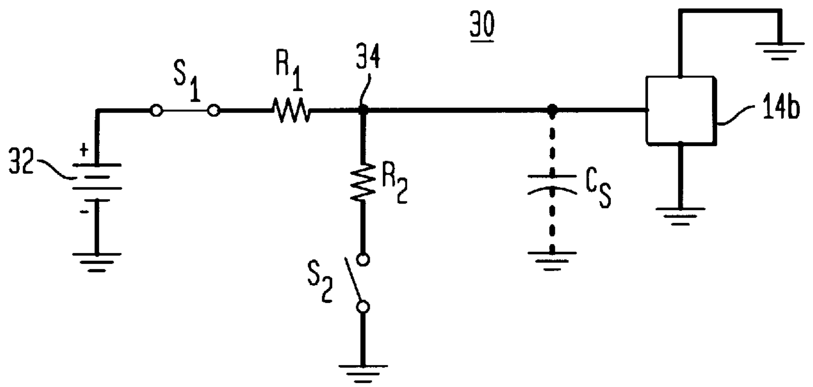
FIG. 3 shows a functional block diagram for the ion pump relay control circuit of the present invention.

Referring now to FIG. 3, there is shown a functional block diagram for the ion pump relay control circuit 30 of the present invention. Circuit 30 includes a source 32 of high voltage, typically in the order of 6.5 KV, that powers the ion pump 14*b*. The output of source 32 is connected through the series combination of a switch S1, in the form of a normally closed (NC) relay, and a resistor R1 to junction 34. The NC relay S1 delivers the voltage of source 32 to the ion pump 14*b*. Junction 34 is connected to ground through the series combination of a resistor R2 and a switch S2 in the form of a normally open (NO) relay. The ion pump 14*b* has stray capacitance Cs, which is shown in dashed lines in FIG. 3.

With switch S1 normally closed and switch S2 normally open the ion pump 14*b* is energized and can continue to maintain the vacuum in the chamber 14. When it is desired to have a new sample gas enter into the chamber 14, the ion pump should be stopped and the stray capacitance Cs, should be discharged before the leak valve 18 is opened to admit the new sample gas. The ion pump relay control circuit 30 causes NC relay Si to break before NO relay S2 makes when it is desired to have a new sample gas enter into chamber 14.

The breaking of NC relay S1 removes the voltage of source 32 from the ion pump 14*b* and the subsequent making of NO relay S2 causes stray capacitance Cs to discharge. When the ion pump 14*b* is turned on, circuit 30 causes NO relay S2, which is closed when the pump is off, to open before NC relay S1, which is open when the pump is off, is closed.

Figure 4:
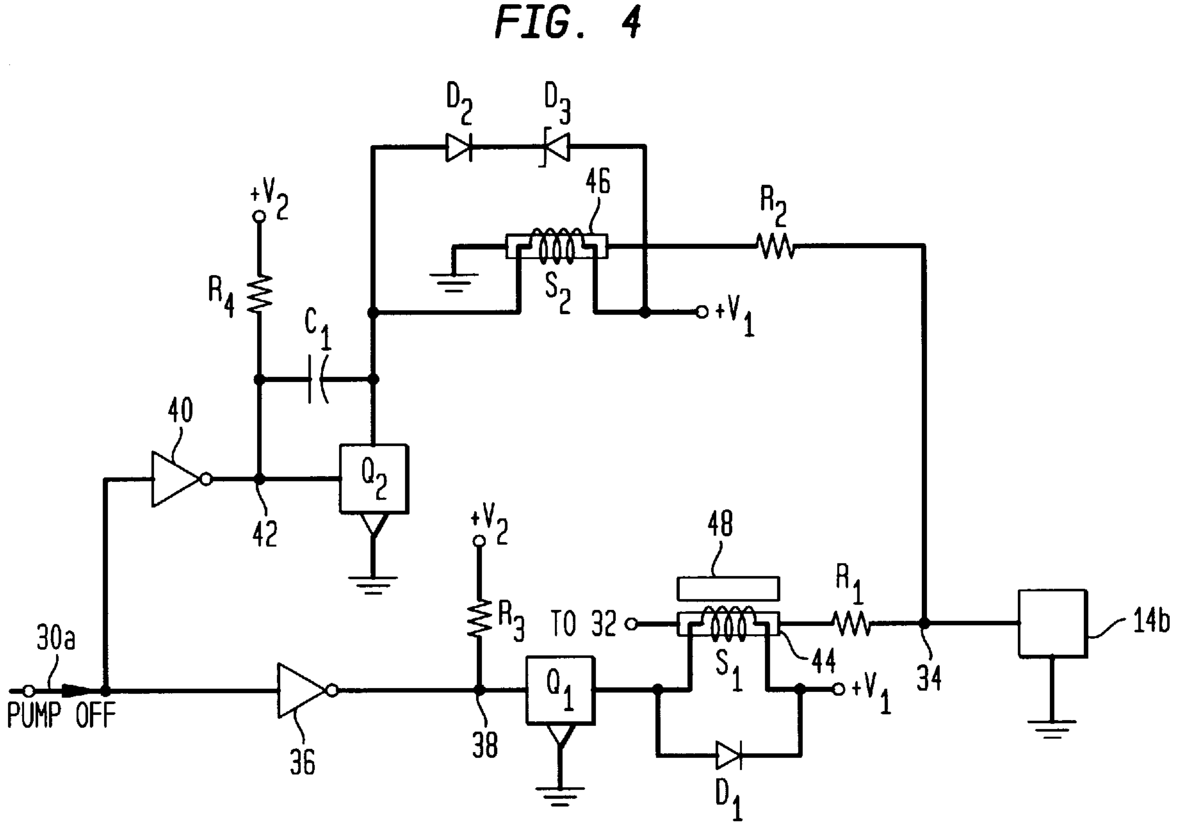
FIG. 4 shows a simplified schematic for the ion pump relay control circuit.

Referring now to FIG. 4, there is shown a simplified schematic for circuit 30. The input 30*a* of circuit 30 has a signal, labeled as Pump Off in FIG. 4, which is at zero volts when the pump 14*b* is pumping. The signal at input 30*a* is connected through an inverter 36 to junction 38. Junction 38 is connected through a resistor R3 to a positive voltage +V2 and to one electrode of a transistor Q1 which is associated with NC relay S1. The signal at input 30*a* is connected through an inverter 40 to a junction 42. Junction 42 is connected through a resistor R4 to the positive voltage +V2 and to one electrode of a transistor Q2 which is associated with NO relay S2. The transistors Q1 and Q2 each have another electrode connected to ground. A capacitor C1 is connected between transistor Q2 and junction 42 to thereby form a Miller integrator circuit.

NC relay S1 is held closed by a permanent DC magnet 48. The coil 44 of NC relay Si is connected between a positive voltage +V1 and the third electrode of transistor Q1. A diode D1 is also connected across coil 44. The coil 46 of NO relay S2 is connected between the positive voltage +V1 and the third electrode of transistor Q2. The series combination of a diode D2 and a Zener diode D3 is connected across coil 46.

NC relay S1 is connected to source 32 and through resistor R1 to junction 34 and ion pump 14*b*. NO relay S2 is connected to ground and through resistor R2 to junction 34 and ion pump 14*b*. The type for transistors Q1 and Q2 are both selected so that both transistors are off when pump 14*b* is pumping. This ensures that the ion pump 14*b* will continue to pump even if the signal at input 30*a* is lost as long as there is a source of power for the positive voltage, +V2, connected to the transistors Q1 and Q2 and the positive voltage +V1 connected to relay coils 44 and 46.

When the ion pump 14*b* is to be stopped, the amplitude of the Pump Off signal at input 30*a* becomes negative. As was described in connection with FIG. 3, when the ion pump 14*b* is to be stopped, NC relay S1 should be opened before NO relay S2 is closed. Circuit 30 accomplishes this result by turning on transistor Q1 faster than it turns on transistor Q2 when the amplitude of the Pump Off signal becomes negative. Transistor Q2 turns on slower than transistor Q1 because of the Miller integrator circuit. Therefore, when ion pump 14*b* is to be stopped, circuit 30 first turns on transistor Q1 to open the NC relay S1 to thereby disconnect voltage source 32 from the ion pump and then turns on transistor Q2 to close the NO relay S2 to thereby ground the stray capacitance Cs of the ion pump.

When ion pump 14*b* is to be turned on again, the Pump Of f signal returns to zero volts. Transistors Q1 and Q2 are both turned off quickly. The NO relay, S2 which was closed when the ion pump 14*b* is off, however, opens quicker than the NC relay S1, which was open when the ion pump is off, closes. This is because of Zener diode D3 which is connected to the voltage +V1 connected to coil 46. In one embodiment for circuit 30, the voltage +V1 connected to coils 44 and 46 was +12 Volts. In that same one embodiment for circuit 30, relays S1 and S2 were both reed relays to minimize arcing and the resistance of resistors R1 and R2 were 100 Kohms to limit the current in circuit 30 if both switches S1 and S2 are closed and also to protect the relay points from pitting.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A mass spectrometer comprising a. A vacuum chamber containing a mass spectrometer for mass analyzing ions therein b. an ion pump; and c. a circuit for controlling said ion pump comprising:

i. a first switch connected between a source of electrical power and said ion pump, said first switch closed when said ion pump is pumping;

ii. a second switch connected between ground and said ion pump, said second switch open when said ion pump is pumping; and iii. means for controlling the opening and closing of said first and second switches responsive to a signal indicative that said ion pump is to be turned off for opening said first switch before said second switch is closed wherein said ion pump is coupled to said vacuum chamber.

2. The mass spectrometer of claim 1 wherein said means for controlling the opening and closing of said first and second switches is responsive when said ion pump is stopped to a signal for starting said ion pump for opening said second switch before said first switch is closed.

3. A mass spectrometer comprising a. A vacuum chamber containing a mass spectrometer for mass analyzing ions therein b. an ion pump; and c. a circuit for controlling said ion pump comprising:

i. a first switch connected between a source of electrical power and said ion pump, said first switch closed when said ion pump is pumping;

ii. a second switch connected between ground and said ion pump, said second switch open when said ion pump is pumping; and iii. a first device connected to said first switch and a second device connected to said second switch, said first and second devices responsive to a signal indicative that said ion pump is to be turned off for opening said first switch before said second switch is closed wherein said ion pump is coupled to said vacuum chamber.

4. The mass spectrometer of claim 3 wherein said first and said second devices are each responsive when said ion pump is stopped to a signal for starting said ion pump for opening said second switch before said first switch is closed.

5. The mass spectrometer of claim 3 wherein said first and said second devices are semiconductor devices.

6. The mass spectrometer of claim 4 wherein said first and said second devices are semiconductor devices.

* * * * *